US012617388B2

(12) United States Patent
Laine et al.

(10) Patent No.: US 12,617,388 B2
(45) Date of Patent: May 5, 2026

(54) PREDICTIVE HEAVY-DUTY VEHICLE MOTION MANAGEMENT BASED ON ENVIRONMENT SENSING

(71) Applicant: VOLVO TRUCK CORPORATION, Gothenburg (SE)

(72) Inventors: Leo Laine, Härryda (SE); Kristoffer Tagesson, Hammarö (SE); Mikael Askerdal, Åsa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 9 days.

(21) Appl. No.: 18/721,553

(22) PCT Filed: Dec. 20, 2021

(86) PCT No.: PCT/EP2021/086758
§ 371 (c)(1),
(2) Date: Jun. 18, 2024

(87) PCT Pub. No.: WO2023/117031
PCT Pub. Date: Jun. 29, 2023

(65) Prior Publication Data
US 2025/0058766 A1     Feb. 20, 2025

(51) Int. Cl.
B60W 30/02     (2012.01)
B60W 40/068     (2012.01)
(Continued)

(52) U.S. Cl.
CPC .......... B60W 30/02 (2013.01); B60W 40/068 (2013.01); B60W 50/0097 (2013.01);
(Continued)

(58) Field of Classification Search
None
See application file for complete search history.

(56) References Cited

U.S. PATENT DOCUMENTS 9,311,761 B1     4/2016   Ye et al.
11,226,620 B2 *  1/2022   Zhao .................... G05D 1/0223
(Continued)

FOREIGN PATENT DOCUMENTS

AU     2021481037 A1 *  6/2024  ............ B60W 30/06
CN     108297872 A  *  7/2018  .......... B60W 40/076
(Continued)

OTHER PUBLICATIONS

International Search Report and Written Opinion of the International Searching Authority in corresponding International Application No. PCT/EP2021/086758 mailed Aug. 25, 2022 (12 pages).
(Continued)

*Primary Examiner* — Kevin R Steckbauer
(74) *Attorney, Agent, or Firm* — Jeffri A. Kaminski; Venable LLP

(57)     ABSTRACT

A control unit for controlling a heavy-duty vehicle, the control unit being arranged to receive ambient environment data from one or more environment sensors on the heavy-duty vehicle, and to predict an impact of the ambient environment on the motion of the heavy-duty vehicle, wherein the control unit is arranged to coordinate control of one or more motion support devices, MSDs, on the heavy-duty vehicle to compensate for the predicted impact of the ambient environment on the motion of the heavy-duty vehicle.

17 Claims, 5 Drawing Sheets

(51) Int. Cl.
 *B60W 50/00*  (2006.01)
 *B60W 60/00*  (2020.01)
(52) U.S. Cl.
 CPC . *B60W 60/00182* (2020.02); *B60W 2300/145*
  (2013.01); *B60W 2420/403* (2013.01); *B60W*
  *2420/408* (2024.01); *B60W 2520/26* (2013.01);
  *B60W 2530/20* (2013.01); *B60W 2552/05*
  (2020.02); *B60W 2552/40* (2020.02); *B60W*
  *2555/20* (2020.02); *B60W 2556/45* (2020.02);
  *B60W 2710/207* (2013.01)

(56)      References Cited

U.S. PATENT DOCUMENTS

| | | | | |
|---|---|---|---|---|
| 11,267,522 B2 * | 3/2022 | Sardes | | B60K 23/00 |
| 11,453,387 B1 * | 9/2022 | Huennekens | | B60W 10/04 |
| 11,554,778 B2 * | 1/2023 | Fairgrieve | | B60W 10/10 |
| 11,654,932 B2 * | 5/2023 | Katzourakis | | G01C 21/3691 |
| | | | | 701/23 |
| 11,654,987 B2 * | 5/2023 | Sardes | | B60K 17/356 |
| | | | | 180/294 |
| 11,731,633 B2 * | 8/2023 | Tulpule | | B60W 30/188 |
| | | | | 701/54 |
| 12,162,494 B2 * | 12/2024 | Ghandriz | | B60W 30/18172 |
| 2015/0217766 A1 * | 8/2015 | Kelly | | B60W 10/184 |
| | | | | 701/94 |
| 2015/0285712 A1 * | 10/2015 | Singh | | B60T 8/171 |
| | | | | 73/8 |
| 2019/0024781 A1 * | 1/2019 | Chrungoo | | G08G 1/0133 |
| 2019/0100207 A1 * | 4/2019 | Maruyama | | B60W 10/107 |
| 2019/0161082 A1 * | 5/2019 | Fairgrieve | | B60W 30/143 |
| 2020/0141758 A1 | 5/2020 | Escama Sanchez | | |
| 2020/0257292 A1 * | 8/2020 | Zhao | | B60Q 9/00 |
| 2020/0276974 A1 * | 9/2020 | Tulpule | | B60W 30/188 |
| 2021/0046937 A1 | 2/2021 | Hattori et al. | | |
| 2021/0046938 A1 | 2/2021 | Hattori et al. | | |
| 2021/0331663 A1 * | 10/2021 | Newton | | G06N 3/08 |
| 2022/0126799 A1 * | 4/2022 | Arikere | | B60T 8/171 |
| 2022/0204017 A1 * | 6/2022 | Barton-Sweeney | | |
| | | | | B60W 40/068 |
| 2022/0266837 A1 * | 8/2022 | Askerdal | | G01C 21/3841 |
| 2023/0150482 A1 * | 5/2023 | Prokes | | B60G 17/0165 |
| | | | | 701/37 |
| 2023/0249709 A1 * | 8/2023 | Katzourakis | | B60W 60/001 |
| | | | | 701/23 |
| 2023/0415746 A1 * | 12/2023 | Ghandriz | | B60W 50/06 |
| 2024/0001928 A1 * | 1/2024 | Ghandriz | | B60T 1/10 |
| 2024/0174243 A1 * | 5/2024 | Zeng | | B60W 50/045 |
| 2024/0182041 A1 * | 6/2024 | Laine | | B60C 99/006 |
| 2024/0190446 A1 * | 6/2024 | Laine | | B60T 8/172 |
| 2024/0367639 A1 * | 11/2024 | Laine | | B60W 30/02 |
| 2025/0050911 A1 * | 2/2025 | Wiberg | | B60W 30/06 |
| 2025/0058766 A1 * | 2/2025 | Laine | | B60W 40/1005 |
| 2025/0115248 A1 * | 4/2025 | Otoofi | | H04W 4/46 |

FOREIGN PATENT DOCUMENTS

| | | | | | |
|---|---|---|---|---|---|
| CN | 111736588 A | * | 10/2020 | | B60W 30/16 |
| CN | 113557157 A | * | 10/2021 | | B60W 30/02 |
| CN | 108297872 B | * | 5/2023 | | B60W 40/076 |
| CN | 116061947 A | * | 5/2023 | | B60C 23/0486 |
| CN | 111736588 B | * | 9/2023 | | B60W 10/04 |
| CN | 113557157 B | * | 9/2023 | | B60K 28/16 |
| CN | 117120278 A | * | 11/2023 | | G01M 17/02 |
| CN | 117120283 A | * | 11/2023 | | B60C 99/006 |
| CN | 117120284 A | * | 11/2023 | | G07C 5/10 |
| CN | 119953323 A | * | 5/2025 | | |
| CN | 119975409 A | * | 5/2025 | | |
| CN | 119953323 B | * | 6/2025 | | |
| EP | 3028909 A1 | | 6/2016 | | |
| EP | 3466788 A1 | * | 4/2019 | | B60K 6/543 |
| EP | 3851346 A1 | * | 7/2021 | | B60W 40/107 |
| EP | 4183601 A1 | * | 5/2023 | | B60W 10/16 |
| EP | 4183602 A1 | * | 5/2023 | | B60G 17/0165 |
| EP | 3851346 B1 | * | 11/2023 | | B60W 30/18172 |
| EP | 4255762 B1 | * | 9/2024 | | H02P 3/14 |
| EP | 4247686 B1 | * | 12/2024 | | B62D 59/04 |
| EP | 4247695 B1 | * | 12/2024 | | B62D 59/04 |
| EP | 4308826 B1 | * | 2/2025 | | B60L 58/15 |
| EP | 4319995 B1 | * | 2/2025 | | G07C 5/10 |
| EP | 4534302 A1 | * | 4/2025 | | H04W 4/46 |
| EP | 4319990 B1 | * | 5/2025 | | G01M 17/02 |
| EP | 4319996 B1 | * | 6/2025 | | B60W 40/1005 |
| EP | 4355602 B1 | * | 6/2025 | | B60W 10/18 |
| GB | 2552021 A | * | 1/2018 | | B60W 30/143 |
| JP | 2024517072 A | * | 4/2024 | | G07C 5/10 |
| JP | 2024517073 A | * | 4/2024 | | G01M 17/02 |
| JP | 2024517378 A | * | 4/2024 | | B60C 99/006 |
| JP | 2025500300 A | * | 1/2025 | | B60W 60/00182 |
| KR | 20150044433 A | * | 4/2015 | | B60K 31/02 |
| KR | 101859574 B1 | * | 6/2018 | | B60W 30/143 |
| KR | 20230164079 A | * | 12/2023 | | G07C 5/10 |
| KR | 20230164080 A | * | 12/2023 | | G01M 17/02 |
| KR | 20230167362 A | * | 12/2023 | | B60W 40/064 |
| KR | 20240121243 A | * | 8/2024 | | B60W 60/00182 |
| SE | 201951478 A1 | | 6/2021 | | |
| WO | 2019072379 A1 | | 4/2019 | | |
| WO | WO-2021018371 A1 | * | 2/2021 | | G01C 21/3461 |
| WO | WO-2022146604 A1 | * | 7/2022 | | B60W 40/068 |
| WO | WO-2022214173 A1 | * | 10/2022 | | B60T 8/172 |
| WO | WO-2022214174 A1 | * | 10/2022 | | B60W 40/12 |
| WO | WO-2022214175 A1 | * | 10/2022 | | B60W 40/12 |
| WO | WO-2023117031 A1 | * | 6/2023 | | B60W 60/00182 |
| WO | WO-2023126049 A1 | * | 7/2023 | | B60W 30/06 |
| WO | WO-2025073375 A1 | * | 4/2025 | | H04W 4/46 |

OTHER PUBLICATIONS

Hans B. Pacejka; Chapter 7—Single-Contact-Point Transient Tire Models, "Tire and Vehicle Dynamics" (Third Edition); published Butterworth-Heinemann, 2012; pp. 329-354 (26 pages); ISBN 9780080970165; https://doi.org/10.1016/B978-0-08-097016-5.00007-3.

European Communication pursuant to Article 94(3) EPC dated Jul. 11, 2025 in corresponding European Patent Application No. 21843632.7, 10 pages.

* cited by examiner

400

410

430

100

420

420

120

110

500

550

540

530

WIND

520

510

120

110

100

PREDICTIVE HEAVY-DUTY VEHICLE MOTION MANAGEMENT BASED ON ENVIRONMENT SENSING

CROSS-REFERENCE TO RELATED APPLICATIONS

This application is a U.S. National Stage application of PCT/EP2021/086758, filed Dec. 20, 2021 and published on Jun. 29, 2023, as WO 2023/117031, all of which is hereby incorporated by reference in its entirety.

TECHNICAL FIELD

The present disclosure relates to vehicle motion management for heavy-duty vehicles, i.e., coordinated control of motion support devices such as service brakes and propulsion devices.

The invention can be applied in heavy-duty vehicles such as trucks, buses, and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion management (VMM) functionality executed, e.g., on a central vehicle control unit (VCU) or distributed over a network of electronic control units (ECU) relies on a coordinated plurality of MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy-duty vehicle.

EP 3851346 A1 Also Discloses Methods for Vehicle Motion Management.

The MSD control on a heavy-duty vehicle is normally based on feedback, i.e., the MSDs are coordinated based on sensor input indicative of the current vehicle state compared to a desired target vehicle state, such that an already existing discrepancy between the estimated vehicle state and the desired vehicle state is reduced. It is of course desired to reduce this discrepancy as much as possible and also as fast as possible.

SUMMARY

It is an object of the present disclosure to provide control units and methods which facilitate improved vehicle motion management for heavy-duty vehicles, i.e., improved coordination and actuation of a plurality of MSDs on the heavy-duty vehicle. This object is at least in part obtained by a control unit for controlling a heavy-duty vehicle. The control unit is arranged to receive ambient environment data from one or more environment sensors on the heavy-duty vehicle, and to predict an impact of the ambient environment on the motion of the heavy-duty vehicle. The control unit is also arranged to coordinate control of one or more MSDs on the heavy-duty vehicle to compensate for the predicted impact of the ambient environment on the motion of the heavy-duty vehicle.

This way effects from changes in the environment can be compensated for instantaneously or even before the change occurs, which means that the environment changes will never have time to cause significant discrepancy between a desired motion state of the vehicle and an actual motion state of the vehicle. All-in-all the proposed technique results in a smoother more convenient vehicle motion if this is desired. The techniques are able to predict a direction resistance impact due to a change in the environment and/or a yaw moment resistance impact.

The techniques disclosed herein can also be used to reduce component wear, since smaller MSD actuation can be used overall. For instance, in case an increase is rolling resistance is predicted, then a relatively slow increase in vehicle speed can be configured in order to compensate for the upcoming change, which slow increase will most likely result in less component wear compared to a strong actuation at a later point in time. The same is of course very much true for actuation of friction brakes, where harder braking leads to increased brake pad wear.

The ambient environment data may, for instance, comprise a road surface condition along one or more predicted wheel tracks of the heavy-duty vehicle. The predicted impact of the ambient environment on the motion of the heavy-duty vehicle may then comprise a predicted change in rolling resistance for one or more wheels on the heavy-duty vehicle. Notably, changes in road surface condition which will not be traversed by one or more wheel tracks will not affect the motion of the heavy-duty vehicle. For instance, a patch of ice which the vehicle will drive over without coming into contact with will not be compensated for by the herein proposed techniques. This allows for an even more accurate compensation of changes in road surface conditions, made possible by the prediction of wheel tracks in connection to the estimated upcoming road surface conditions.

The ambient environment data may also comprise wind speed and or wind direction data. In this case the predicted impact of the ambient environment on the motion of the heavy-duty vehicle comprises a predicted change in wind force on the heavy-duty vehicle. This way the vehicle motion controller can account for changes in wind conditions even before these conditions have been manifested as changes in vehicle state, which is an advantage.

The one or more environment sensors preferably comprises a forward looking camera, lidar or radar sensor arranged to scan the road surface ahead of the vehicle, in order to detect changes in, e.g., road surface conditions before they are encountered by the wheels of the vehicle. One or more anemometers and also rain gauges may optionally be configured on the vehicle to monitor weather conditions. The data from the anemometers and the rain gauges may also be complemented or replaced by weather report data received from an external source, such as a remote server or the like.

According to some aspects, the predicted impact of the ambient environment on the motion of the heavy-duty vehicle is at least in part determined based on a model of a tyre mounted onto a wheel on the heavy-duty vehicle. This tyre model makes it possible to more accurately predict an impact from a given change in, e.g., road surface conditions. For instance, some types of tyres are less sensitive to puddles of water than other types of tyres, mainly depending on thread depth.

The control unit is optionally arranged to control the one or more MSDs on the heavy-duty vehicle to generate a longitudinal and/or lateral wheel force to compensate for the predicted impact of the ambient environment on the motion of the heavy-duty vehicle. The change in wheel force may be determined as a coordination of several MSDs, which is an advantage. For instance, a slight increase in wheel force on one side of the vehicle may be used to compensate for the impact of an upcoming puddle of water. The control unit may also be arranged to account for lateral and/or longitudinal relaxation length of one or more tyres of the heavy-duty vehicle, when controlling said one or more MSDs, by increasing tyre slip ahead of the predicted impact. Again, this means that the vehicle controller has knowledge of key tyre properties, which it can use to predictively compensate for changes in operating conditions.

According to other aspects, the control unit is arranged to control the one or more MSDs on the heavy-duty vehicle to generate a steering angle to compensate for the predicted impact of the ambient environment on the motion of the heavy-duty vehicle. This steering angle may be applied before, on, or slightly after the onset of the impact, thus compensating for the change in operating conditions. Related to this feature, the control unit may also account for a known lateral relaxation length of a tyre on the heavy-duty vehicle by generating a compensating steering angle ahead of the predicted impact. The control unit may also be arranged to account for one or more predetermined dynamic properties of an MSD by changing the set-point of said MSD ahead of the predicted impact. Thus, the predicted change in operating conditions is compensated by an actuation, which in itself comprises a prediction of how the MSD will react to a given request, or update in set-point. The future MSD behavior is then matched to the future operating conditions, thereby allowing a further increase in vehicle motion management accuracy.

The control unit can also be arranged to classify a section of road surface ahead of the vehicle in dependence of road type, where each road type is associated with an expected rolling resistance. For instance, a change from gravel road to asphalt can be traversed in a smooth manner.

The ambient environment data may furthermore comprise data from one or more smart tyre sensors. In this case the control unit can be arranged to determine a road surface condition based on the data from the one or more smart tyre sensors, and to use the data for controlling one or more MSDs arranged rearward from the wheel comprising the smart tyre sensors. This increases the amount of available data, which is an advantage.

The control unit may furthermore be arranged to classify a section of road surface ahead of the vehicle in dependence of data gather during a previous drive on the road section. Thus, the vehicle can be configured to collect data as it drives along one or more routes. The data is stored in memory, and later used to refine the predictions of the impact by the environment on the motion of the vehicle. This improves the motion prediction. The data can of course be shared with other vehicles of the same type, which can be expected to show some correlation in the impact on vehicle motion by a given change in operating condition.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
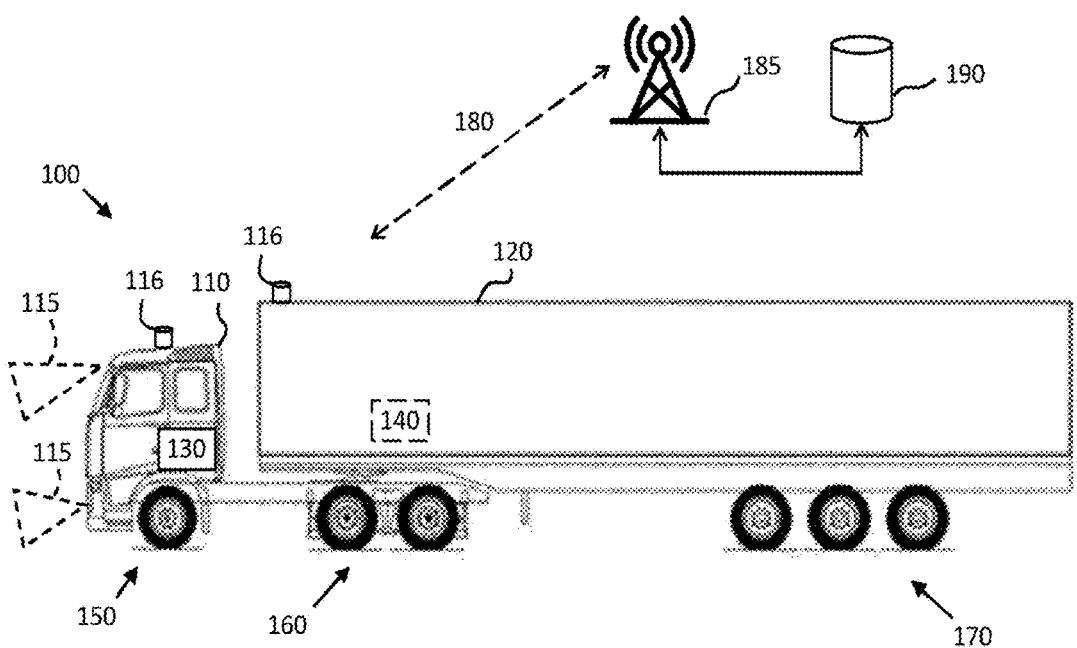
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles.

It is appreciated that the herein disclosed methods and control units can be applied with advantage also in other types of heavy-duty vehicles, such as rigid trucks, trucks with drawbar connections, construction equipment, buses, and the like.

The tractor 110 comprises a vehicle unit computer (VUC) 130 for controlling various kinds of functionality, i.e. to achieve propulsion, braking, and steering. Some trailer units 120 also comprise a VUC 140 for controlling various functions of the trailer, such as braking of trailer wheels, and sometimes also trailer wheel propulsion. The VUCs 130, 140 may be centralized or distributed over several processing circuits. Parts of the vehicle control functions may also be executed remotely, e.g., on a remote server 190 connected to the vehicle 100 via wireless link 180 and a wireless access network 185.

One or more sensor devices 115, 116 mounted on the vehicle 100 are arranged to provide input data to the VUCs. These sensor devices can be used for vehicle environment estimation, i.e., to obtain information regarding the surrounding environment in which the vehicle 100 is operating. This information may, e.g., comprise data related to the nature of the road surface up ahead of the vehicle, the temperature, the wind conditions, and so on.

For instance, a forward looking sensor system 115, such as a camera sensor arrangement or a lidar scanner, can be used to classify the road surface conditions up ahead of the vehicle, and in particular along predicted tracks of the wheels 150, 160, 170. This road surface condition can then be used to predict a change in rolling resistance at one or more wheels before it occurs. For instance, if there is a large puddle of water on the right-hand side of the road which will be hit by the right-hand side wheels of the vehicle 100, a change in yaw moment is to be expected due to the increase in rolling resistance. However, by the techniques disclosed herein, this change in rolling resistance can be compensated for even before it occurs, due to the availability of the road surface condition prediction for individual wheels of the heavy-duty vehicle 100.

One or more anemometers 116 can also be arranged on the truck 110 and/or on the trailer 120 to measure current wind speed and direction. A shift in wind speed or direction can therefore be compensated for with low latency. Since the MSD compensation for the change in wind speed or direction may be applied rapidly, the significant vehicle mass of a heavy-duty vehicle like that in FIG. 1 will not have had time to change state due to the change in wind conditions, and the overall vehicle control actions can therefore be of smaller magnitude compared to the case where large errors in vehicle state have had time to develop which need to be overcome by resolute action by the MSDs.

A rain gauge may also be mounted onto the roof of the vehicle 100, and configured to measure an amount of rain fall.

The VUC 130 on the tractor 110 (and possibly also the VUC 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

Figure 2:
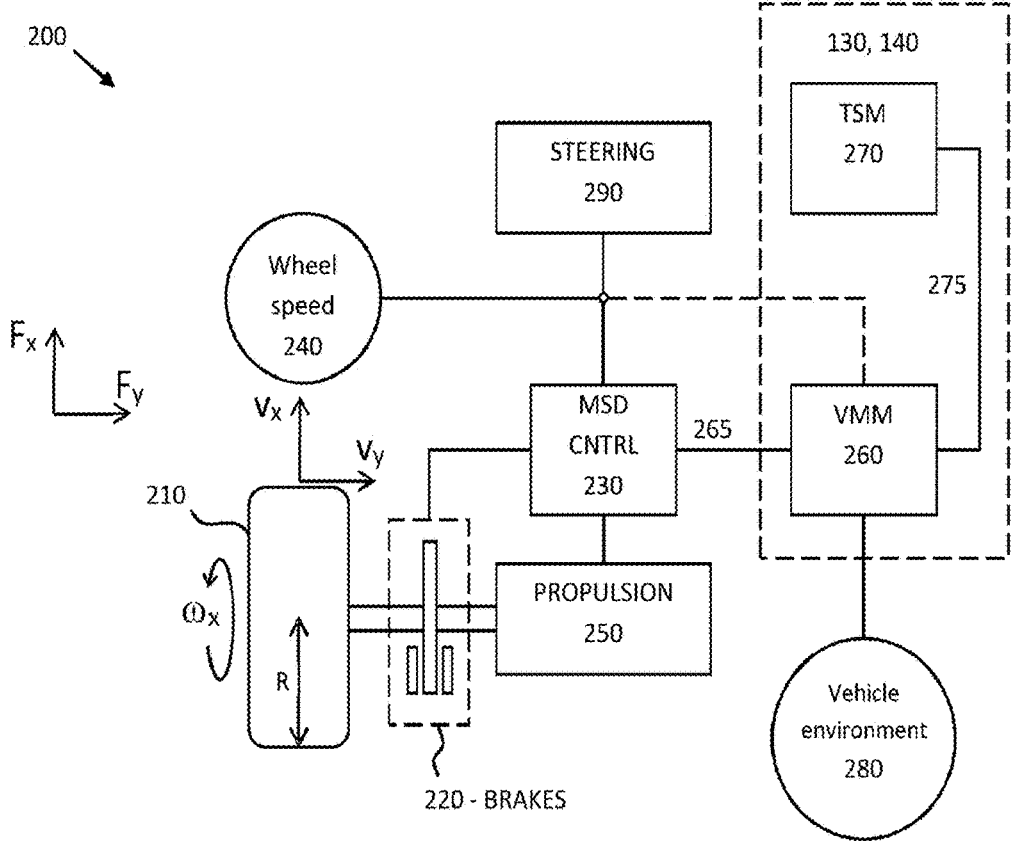
FIG. 2 schematically illustrates a motion support device arrangement.

FIG. 2 schematically illustrates functionality 200 for controlling a wheel 210 by some example MSDs here comprising a friction brake 220 (such as a disc brake or a drum brake), means for steering 290 such as a power steering arrangement, and a propulsion device 250. The friction brake 220 and the propulsion device are examples of wheel torque generating devices, which may also be referred to as actuators and which can be controlled by one or more motion support device control units 230. The control is based on, e.g., measurement data obtained from a wheel speed sensor 240 and from other vehicle state sensors, such as radar sensors, lidar sensors, and also vision based sensors such as camera sensors and infra-red detectors.

Other example torque generating motion support devices which may be controlled according to the principles discussed herein comprise engine retarders and power steering devices. An MSD control unit 230 may be arranged to control one or more actuators. For instance, it is not uncommon that an MSD control unit 230 is arranged to control both wheels on an axle.

The TSM function 270 plans driving operation with a time horizon of, e.g., 10 seconds or so. This period corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests 275 the desired acceleration profiles $a_{req}$ and curvature profiles $c_{req}$ from the VMM function 260 which performs force allocation to meet the requests from the TSM in a safe and robust manner. The VMM function 260 continuously feeds back capability information to the TSM function 270 detailing the current capability of the vehicle in terms of, e.g., forces, maximum velocities, and accelerations which can be generated.

The desired motion may be configured in dependence of component wear. If this is the case then large magnitude maneuvering is normally undesired. For instance, a longer period of smaller actuation force braking if often preferred over a shorter period of very hard braking. The same is true to, e.g., propulsion by an electric machine-reasonable levels of actuation are often preferred over high magnitude actuation.

Acceleration profiles and curvature profiles may also be obtained from a driver of the heavy-duty vehicle via normal control input devices such as a steering wheel, accelerator pedal and brake pedal. The source of said acceleration profiles and curvature profiles is not within scope of the present disclosure and will therefore not be discussed in more detail herein.

An important part of the present disclosure is the vehicle environment sensor arrangement 280. This sensor arrangement is configured to provide input data to the VMM function 260 regarding the operating environment surrounding the vehicle 100. The estimated operating environment may, e.g., comprise information related to an upcoming change in rolling resistance for one or more wheels of the vehicle 100 detected by the forward looking sensors 115 and/or wind conditions detected by the one or more anemometers 116.

To improve the overall vehicle motion management of a heavy-duty vehicle such as the vehicle 100, and make it more resilient to abrupt changes in operating conditions, such as abrupt changes in rolling resistance and strong gusts of wind, there is disclosed herein a control unit 130, 140 arranged to receive ambient environment data from one or more environment sensors 115, 116, 280 on the heavy-duty vehicle 100, and to predict an impact of the ambient environment on the motion of the heavy-duty vehicle 100. The ambient environment data may, e.g., comprise a road surface condition along one or more predicted wheel tracks of the heavy-duty vehicle 100. The predicted impact of the ambient environment on the motion of the heavy-duty vehicle then advantageously comprises a predicted change in rolling resistance for one or more wheels 150, 160, 170 on the heavy-duty vehicle 100. The ambient environment data optionally also comprises wind speed and or wind direction data, wherein the predicted impact of the ambient environment on the motion of the heavy-duty vehicle comprises a predicted change in wind force on the heavy-duty vehicle 100.

Models for describing impact of the environment on a given vehicle can be obtained as predetermined models, e.g., from the remote server 190. Such models may be based on physics of the given vehicle, potentially adapted based on, e.g., current vehicle load. Alternatively, or as a complement, models which describe how the environment impacts motion of a given vehicle can be trained on-line by correlating obtained environment data from the environment sensors 280 with estimated or measured vehicle state. Thus, the impact of various changes in the environment is observed, and models are constructed after the impacts have been observed. The models can then be used to predicted future impact based on measurement data from the environment sensors 280.

Machine learning structures can be used to implement such models. For instance, a neural network can be trained to model response by the vehicle to changes in operating conditions, including, e.g., gusts of wind and/or changes in rolling resistance. This model may be obtained as a predetermined model or trained during vehicle operation.

Analytical models, such as look-up tables or parameterized pre-determined functions based on known physical relationships, may of course also be used.

The control unit 130, 140 is furthermore arranged to coordinate control of one or more motion support devices, MSDs, 220, 250, 290 on the heavy-duty vehicle 100 to compensate for the predicted impact of the ambient environment on the motion of the heavy-duty vehicle. This compensation may be triggered before onset of the predicted impact, at the onset of the predicted impact, or slightly after. Thus, the motion management is not only a responsive motion management which acts based on changes in vehicle state which have already occurred, but also comprises an element of feedforward control which targets compensating for undesired vehicle motion as it occurs or even before the change in operating conditions have had a chance to affect the state of the vehicle. This way the discrepancy between actual vehicle state and desired vehicle state can be reduced since the errors are no longer needed for the feedback control in the same way as for a pure feedback control-based vehicle motion management system.

Generally, the control units 130, 140 discussed herein may be arranged to control the one or more MSDs 220, 250 on the heavy-duty vehicle 100 to generate a longitudinal and/or lateral wheel force Fx, Fy to compensate for the predicted impact of the ambient environment on the motion of the heavy-duty vehicle 100 and/or to generate a steering angle to compensate for the predicted impact of the ambient environment on the motion of the heavy-duty vehicle 100.

Advantageously, the MSD control can be optimized at least in part for reduced component wear, i.e., prolonged lifetime of electric machines, friction brake pads, and the like. This reduced component wear can often be achieved by reducing a magnitude of the actuation, such that a smaller magnitude actuation is applied for a longer period of time, compared to a strong actuation which is applied abruptly and for a shorter time duration. This longer time window in which actuation can be performed in order to compensate for an effect due to a change in operating condition, is enabled by the predictive nature of the control. In other words, since the system is now aware of a change in operating conditions before it happens, it has more time to compensate for the effect, since it can start the compensation much sooner than in a pure feedback-based vehicle control system.

Figure 4:
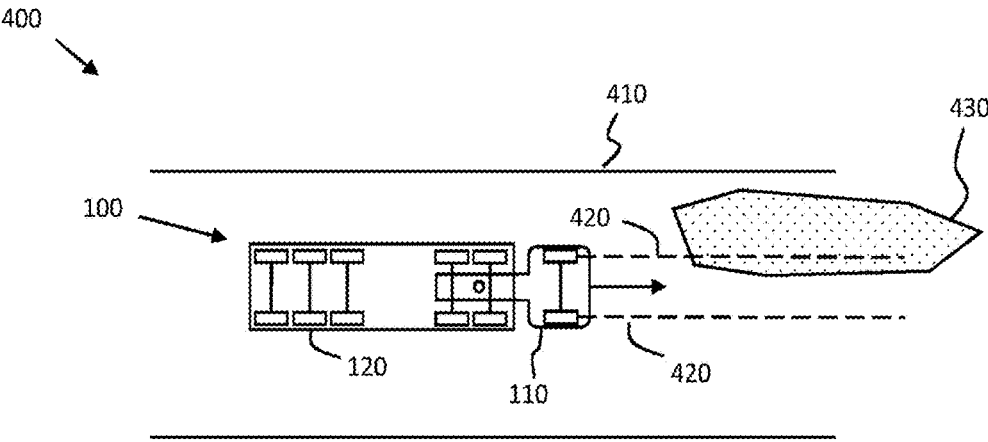
FIGS. 4-5 schematically illustrate example variable rolling resistance environments.

FIG. 4 illustrates an example 400 of the herein proposed control strategy at least partly based on feedforward control of the MSDs. A heavy-duty vehicle 100 comprising the one or more environment sensors and the control unit 130, 140 travels on a road 410. The VMM function on the vehicle 100 estimates that the wheels of the vehicle will follow the indicated wheel tracks 420. A set of forward looking environment sensors on the vehicle 100 detects a water puddle 430 which will result in a likely change in rolling resistance to be encountered by the left wheel of the vehicle 100, but not the right wheels. Thus, the change in rolling resistance will give rise to an undesired yaw motion by the vehicle 100. The VMM function 260 then accounts for the predicted change in rolling resistance, e.g., by increasing applied torque at the left wheels of the tractor 110 to compensate for the water puddle 430, or by applying a small steering angle to compensate for the upcoming undesired yaw motion.

Figure 5:
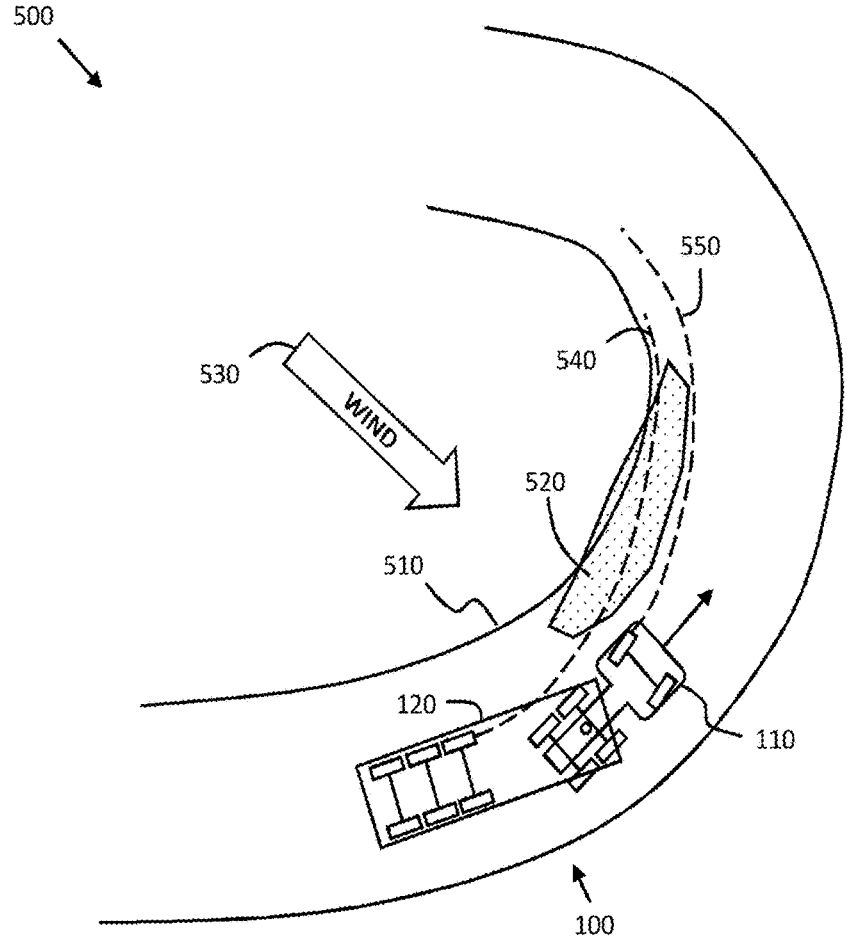

FIG. 5 illustrates another example 500 of the herein proposed control strategy. The vehicle 100 here travels along a road 510 with a curvature. The one or more environment sensors here detects a likely change in rolling resistance 520, and also an abrupt change in wind conditions 530. The predicted wheel tracks 540, 550 indicate that the left wheels of the trailer vehicle unit 120 will encounter the change in rolling resistance 520, but not the wheels of the tractor vehicle unit 110. However, the change in wind conditions will affect both vehicle units 110, 120. The VUC is again able to compensate for the changes in the environment before those changes have had a chance to cause an undesired change in vehicle state, i.e., to cause the vehicle to deviate from the intended path. The total environmental impact is considered when determining the MSD control allocation which compensates for the disturbance and causes the vehicle state to closely follow the desired vehicle state.

The increase in rolling resistance due to, e.g., a stream of water over the road can for instance be compensated by increased longitudinal force before the water resistance reduces the longitudinal speed of the vehicle. This can be done both for open differential drivetrains and in vehicles comprising individual left and right electric machines on a driven axle. If uneven road resistance is predicted the compensating yaw moment can for instance be realized with differential propulsion amounts on the two sides of the vehicle.

Figure 3:
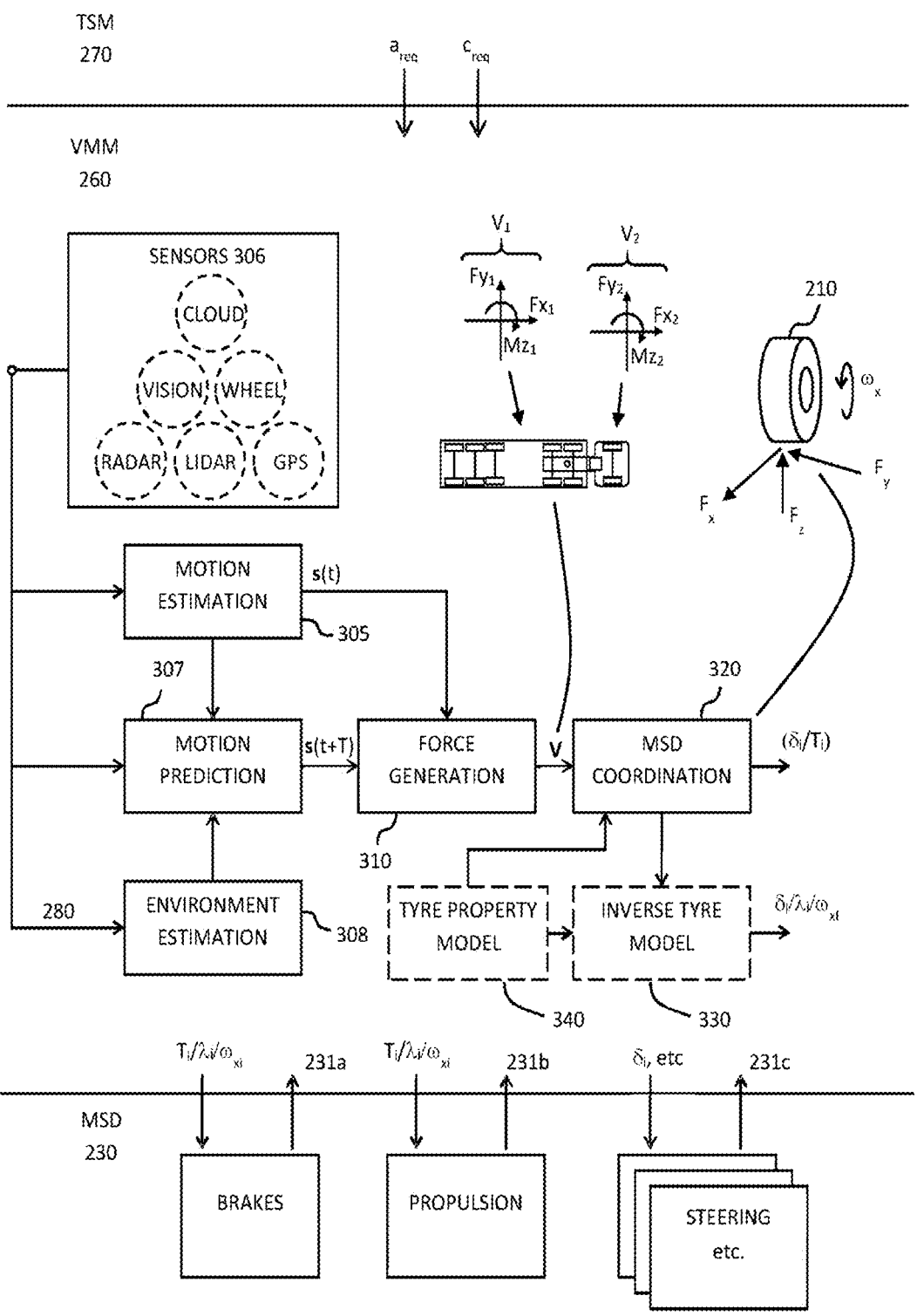
FIG. 3 illustrates a layered vehicle control function architecture.

With reference also to FIG. 3, the VMM function 260 operates with a time horizon of about 1 second or so, and continuously transforms the acceleration profiles $a_{req}$ and curvature profiles $c_{req}$ into control commands for controlling vehicle motion functions, actuated by the different MSDs 220, 250, 290 of the vehicle 100 which report back capabilities 231a, 231b, 231c to the VMM function 260, which in turn are used as constraints in the vehicle control.

The VMM function 260 performs vehicle state or motion estimation 305, i.e., the VMM function 260 continuously determines a current vehicle state at time t, s(t), comprising positions, speeds, accelerations and articulation angles of the different units in the vehicle combination by monitoring operations using various sensors 306 arranged on the vehicle 100, often but not always in connection to the MSDs 220, 250, 290.

The VMM function 260 also performs motion prediction 307, i.e., estimates a future vehicle state s (t+T) at one or more time instants t+T in the future. Both motion estimation 305 and motion prediction 307 are generally known techniques, and several example implementations exist in the literature. These sub-functions will therefore not be discussed in more detail herein. However, it is noted that the motion prediction sub-function 307 of the VMM function 260 here receives input from an environment estimation sub-function 308. This environment estimation sub-function receives input 280 from the one or more environment sensors discussed above, i.e., the forward looking sensors 115 and/or the one or more anemometers 116, and from this data forms an estimate of the surrounding environment of the heavy-duty vehicle 100.

The VMM motion prediction sub-function 307 can now use wind data and data on expected rolling resistance to calculate the overall resistance forces which are currently acting on the vehicle 100, or which will be acting on the vehicle in the near future.

To give an example, suppose that the longitudinal force requirement is modelled as $$F_{x,reg} = m * a_{x,reg} + F_{roll} + F_{airdrag} + F_{wind} + F_{slope}$$

where m is the vehicle mass, $a_{x,reg}$ is a required longitudinal acceleration, $F_{roll}$ represents forces required to compensate for vehicle roll, $F_{airdrag}$ are forces required to compensate for air drag due to vehicle motion, $F_{wind}$ are forces required to compensate for ambient wind conditions, and $F_{slope}$ are forces required to compensate for road slope.

The one or more environment sensors can be used to estimate current and in some cases also future impact by the environment on the vehicle units. $F_{roll}$ can be at least in part predicted by determining a future road geometry to be travelled by the vehicle given its intended path, $F_{airdrag}$ can be determined from vehicle speed and vehicle shape, such as its air drag coefficient and frontal area, $F_{wind}$ can be determined based on vehicle geometry and on the output from the one or more anemometers 116, while $F_{slope}$ can be determined based on output data from the one or more forward looking sensors and or from map data in combination with a GPS sensor.

The result of the motion estimation 305, i.e., the estimated vehicle state s (t), and the predicted future vehicle state s(t+T) is input to a force generation module 310 which determines the required global forces $V=[V_1, V_2]$ for the different vehicle units to cause the vehicle 100 to move according to the requested acceleration and curvature profiles $a_{req}$, $c_{req}$. This force generation module 310 is now able to account for impact by the operating environment, even if such impact has not yet resulted in a change in vehicle state.

The required global force vector V is input to an MSD coordination function 320 which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

The MSD coordination function may also comprise models of the MSD behavior, and will thus be able to account for one or more predetermined dynamic properties of an MSD by changing the set-point of said MSD ahead of the predicted impact. For instance, there could be some delay associated with actuation of a friction brake, and an electric machine may be associated with some delay before generating a given request for torque. The may also be transient effects which are possible to model by measurement, e.g., in a laboratory setting, and then used to predict how an MSD will respond to a given command. This way of controlling an MSD is advantageous, since the control signal to the MSD can be matched to the predicted impact by the change in environment, such that the two cancel out at least approximately.

The MSD coordination function advantageously also comprises optional models of component wear. This allows the MSD coordination function to reduce component wear, by, e.g., triggering a compensation sooner and at a reduced magnitude to avoid large magnitude compensations which could be associated with an increased component wear.

The output of the MSD coordination function 320 may comprise classic torque requests Ti and steering angle requests &, which can be sent to the different MSD controllers 230. It is thus appreciated that the herein discussed control methods can be used in classical torque-based control systems, i.e., where torque requests Ti are sent down to the MSD controllers.

However, by determining vehicle unit motion using sensors 306 such as, e.g., global positioning systems, vision-based sensors, wheel speed sensors, radar sensors and/or lidar sensors, and translating this vehicle unit motion into a local coordinate system of a given wheel 210 (in terms of, e.g., longitudinal and lateral velocity components), it becomes possible to accurately estimate wheel slip in real time by comparing the vehicle unit motion in the wheel reference coordinate system to data obtained from the wheel speed sensor 240 arranged in connection to the wheel 210

Figure 6:
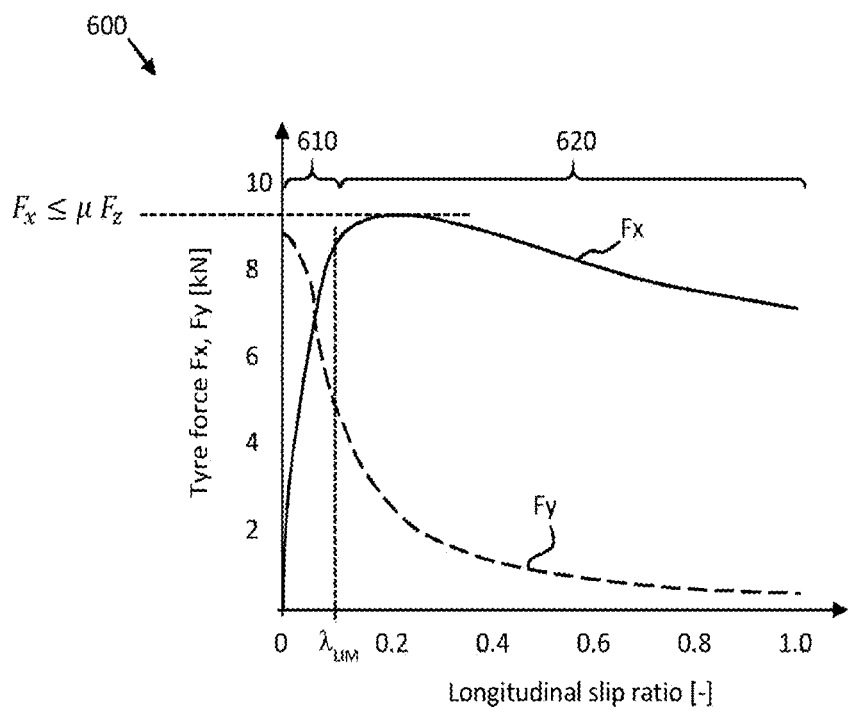
FIG. 6 is a graph showing an example of tyre force as function of wheel slip.

FIG. 6 is a graph showing an example of achievable tyre force as function of wheel slip. The longitudinal tyre force Fx shows an almost linearly increasing part 610 for small wheel slips, followed by a part 620 with more non-linear behaviour for larger wheel slips. The obtainable lateral tyre force Fy decreases rapidly even at relatively small longitudinal wheel slips. It is desirable to maintain vehicle operation in the linear region 610, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 620 is seen. Control of a vehicle in this region may be difficult and is therefore often avoided. It may be interesting for traction in off-road conditions and the like where a larger slip limit for traction control might be preferred, but not for on-road operation.

Herein, an inverse tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

This type of tyre model can be used by the VMM 260 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 230 will be able to deliver the requested torque with much higher bandwidth by maintaining operation at the desired wheel slip, using the vehicle speed $v_x$ and the wheel rotational velocity $\omega_x$.

Figure 7:
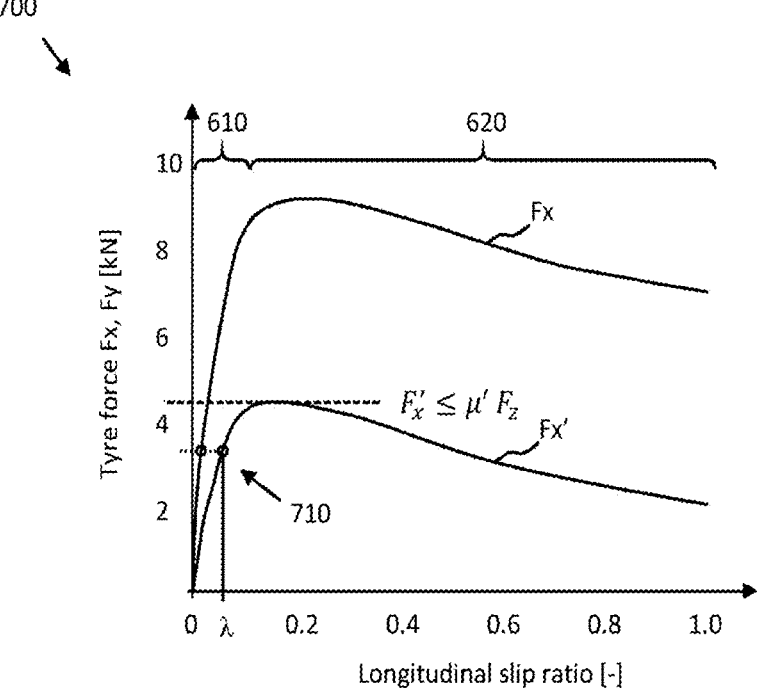
FIG. 7 is another graph showing an example of tyre force as function of wheel slip.
Figure 8:
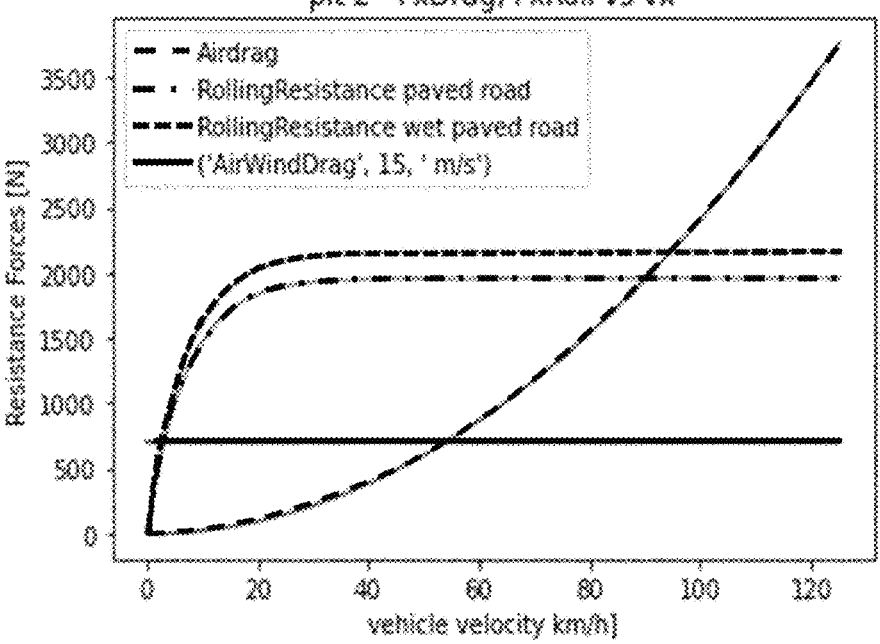
FIG. 8 illustrates resistance forces as function of vehicle velocity.

The inverse tyre model may be implemented at least partly as an adaptive model configured to automatically or at least semi-automatically adapt to the current operating conditions of the vehicle. The inverse tyre model can also be proactively modified in preparation for a predicted change in operating conditions at one or more wheels on the heavy-duty vehicle 100. FIG. 7 illustrates a predicted change in inverse tyre model from an initial model Fx to a predicted model Fx', where the road surface conditions have changed for instance since the road friction will change from friction coefficient $\mu$ to a smaller friction coefficient $\mu'$. The change in inverse tyre model can be predicted by the VMM function 260 based on input data from the environment sensors 280, and a suitable change in control allocation can be determined and communicated to the MSD control units in preparation for the change. For instance, suppose that the desired wheel force is about 3.5 kN, then an increase in wheel slip may be necessary to maintain this wheel force, as indicated by the arrow 710 in FIG. 7.

Referring back to FIG. 3, the optional inverse tyre model block 330 translates the required wheel forces $Fx_i$, $Fy_i$ determined for each wheel, or for a subset of wheels, by the MSD coordination block 320 into equivalent wheel speeds $\omega_{wi}$ or wheel slips $\lambda_j$. These wheel speeds or slips are then sent to the respective MSD controllers 230. The MSD controllers report back capabilities 231a-231c which can be used as constraints in, e.g., the MSD coordination block 320.

To summarize, the VMM function 260 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different amounts of torque to be applied at different wheels.

The predicted impact of the ambient environment on the motion of the heavy-duty vehicle 100 may also at least in part be determined based on a model 340 of the properties of a tyre mounted onto a wheel 210 on the heavy-duty vehicle 100. The tyres on the wheel play a major role in determining the behaviour and capabilities of the MSDs performing control via the tyre. A well-designed set of tyres will provide both good traction and fuel economy, while a poorly designed set of tyres, or overly worn tyres, are likely to reduce both traction and fuel economy and may even result in an unstable vehicle combination, which of course is undesired. A software-based tyre model can be implemented which models tyre parameters and tyre behaviours, e.g., for a given vehicle state such as a vehicle velocity, normal load, and so on, and for a given road surface condition. The tyre models can be used with advantage by the VCU to optimize control of the vehicle 100. For example, the tyre models may be used to model a relationship between generated wheel force and wheel slip in different operating environments. Some example tyre models are configured to model tyre rolling resistance, such that the VCU can optimize vehicle control based on the model. Some important properties and characteristic parameters of a tyre will now be discussed.

These tyre parameters are optionally comprised in the tyre model, either as tyre parameters from which other capabilities and characteristics of the tyre can be determined by the VCU 130, 140, or simply as tyre characteristics which can be used more or less directly by the VCU 130, 140 to optimize various control decisions.

The rolling resistance discussed above is the resistance to rolling caused by deformation of the tyre in contact with the road surface. As the tyre rolls, tread enters the contact area and is deformed flat to conform to the roadway. The energy required to make the deformation depends on the inflation pressure, rotating speed, and numerous physical properties of the tyre structure, such as spring force and stiffness. Tyre makers often seek lower rolling resistance tyre constructions to improve fuel economy in trucks, where rolling resistance accounts for a high proportion of fuel consumption. The default rolling resistance is therefore a property of the tyre, and this rolling resistance will then be affected by the road surface conditions. The impact of the road surface condition on the rolling resistance is also in some case very much dependent on the properties of the tyre. Thus, the impact of different surface conditions on rolling resistance is advantageously modelled by the tyre property model 340. This tyre model can be adapted over time, e.g., by detecting a change in road surface condition and then monitoring the impact the change has on the vehicle motion.

The contact patch, or footprint, of the tyre, is the area of the tread that is in contact with the road surface. This area transmits forces between the tyre and the road via friction. The length-to-width ratio of the contact patch affects steering and cornering behaviour. The tyre tread and sidewall elements undergo deformation and recovery as they enter and exit the footprint. Since the rubber is elastomeric, it is deformed during this cycle. As the rubber deforms and recovers, it imparts cyclical forces into the vehicle. These variations are collectively referred to as tyre uniformity. Tyre uniformity is characterized by radial force variation (RFV), lateral force variation (LFV) and tangential force variation. Radial and lateral force variation is measured on a force variation machine at the end of the manufacturing process. Tyres outside the specified limits for RFV and LFV are rejected. Geometric parameters, including radial runout, lateral runout, and sidewall bulge, are measured using a tyre uniformity machine at the tyre factory at the end of the manufacturing process as a quality check.

The cornering force or side force of a tyre is the lateral (i.e., parallel to the road surface) force produced by a vehicle tyre during cornering.

Self-aligning torque (SAT) is the torque that a tyre creates as it rolls along that tends to steer it, i.e., rotate it around its vertical axis.

A tyre rotating at higher speeds tends to develop a larger diameter, i.e., a larger rolling radius, due to centrifugal forces that force the tread rubber away from the axis of rotation.

This effect is often referred to as centrifugal growth. As the tyre diameter grows, the tyre width decreases. Excessive centrifugal growth may significantly impact the behaviour of a tyre.

The pneumatic trail of a tyre is the trail-like effect generated by resilient material tyres rolling on a hard surface and subject to side loads, as in a turn. The pneumatic trail parameter of a tyre describes the distance where the resultant force of a tyre sideslip occurs behind the geometric centre of the contact patch of the tyre.

Slip angle or sideslip angle, denoted a herein, is the angle between a rolling wheel's actual direction of travel and the direction towards which it is pointing (i.e., the angle of the vector sum of the wheel translational velocity.

The lateral relaxation length of a tyre is a property of a pneumatic tyre that describes the delay between when a lateral slip angle is introduced and when the cornering force reaches its steady state value. Analogously the longitudinal relaxation length of a tyre is a property of a pneumatic tyre that describes the delay between when a longitudinal slip is introduced and when the longitudinal force, acting on the tyre, reaches its steady state value. Normally, relaxation length is defined as the rolling distance needed by the tyre to reach 63% of the steady state force, although other definitions are also possible.

Vertical stiffness, or spring rate, is the ratio of vertical force to vertical deflection of the tyre, and it contributes to the overall suspension performance of the vehicle. In general, spring rate increases with inflation pressure.

The control unit 130, 140 is optionally also arranged to receive weather data, e.g., from a remote server 190 like that discussed above in connection to FIG. 1. This weather data can be used to refine the predictions of rolling resistance, and also perform a more accurate estimation of the overall rolling resistances which can be expected along some given route.

An expected rolling resistance in default weather conditions can be determined by the vehicle 100 or by some other vehicle travelling along a route. This data can then be adjusted based on the weather report, perhaps also in dependence of the tyre model, which may comprise data indicative of different expected rolling resistances in different weather conditions. The control unit 130, 140 may thus be arranged to classify a section of road surface ahead of the vehicle in dependence of data gather during a previous drive on the road section.

The control unit 130, 140 are optionally also arranged to classify a section of road surface ahead of the vehicle in dependence of road type, where each road type is associated with an expected rolling resistance, as discussed above.

The ambient environment data may furthermore comprise data from one or more smart tyre sensors. The control unit 130, 140 may then determine a road surface condition based on the data from the one or more smart tyre sensors, and to use the data for controlling one or more MSDs arranged rearward from the wheel comprising the smart tyre sensors.

Figure 9:
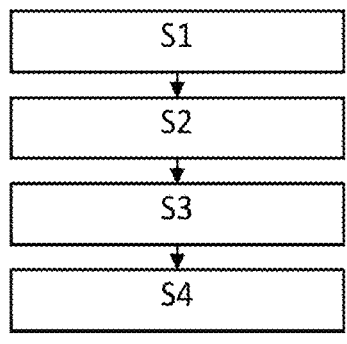
FIG. 9 is a flow chart illustrating a method.

FIG. 9 is a flow chart illustrating methods which summarize at least some of the discussions above. There is illustrated a computer implemented method performed in a control unit 130, 140 for controlling a heavy-duty vehicle 100. The method comprises receiving S1 ambient environment data from one or more environment sensors 115, 116, 280 on the heavy-duty vehicle 100, predicting S2 an impact of the ambient environment on the motion of the heavy-duty vehicle 100, and coordinating S3 control of one or more MSDs 220, 250, 290 on the heavy-duty vehicle 100 to compensate for the predicted impact of the ambient environment on the motion of the heavy-duty vehicle.

Figure 10:
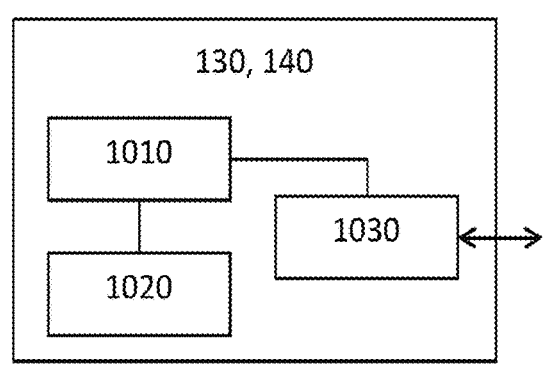
FIG. 10 schematically illustrates a control unit.

FIG. 10 schematically illustrates, in terms of a number of functional units, the components of a control unit such as the VUC 130, 140. The control unit may implement one or more of the above discussed functions of the TSM 270, VMM 260 and/or the MSD control function 230, according to embodiments of the discussions herein. The control unit is configured to execute at least some of the functions discussed above for control of a heavy-duty vehicle 100. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1020. The processing circuitry 1010 may further be provided as at least one application specific integrated circuit ASIC, or field programmable gate array FPGA.

Particularly, the processing circuitry 1010 is configured to cause the control unit 101 to perform a set of operations, or steps, such as the methods discussed in connection to FIG. 9. For example, the storage medium 1020 may store the set of operations, and the processing circuitry 1010 may be configured to retrieve the set of operations from the storage medium 1020 to cause the control unit 1100 to perform the set of operations. The set of operations may be provided as a set of executable instructions. Thus, the processing circuitry 1010 is thereby arranged to execute methods as herein disclosed.

The storage medium 1020 may also comprise persistent storage, which, for example, can be any single one or combination of magnetic memory, optical memory, solid state memory or even remotely mounted memory.

The control unit 1100 may further comprise an interface 1030 for communications with at least one external device. As such the interface 1030 may comprise one or more transmitters and receivers, comprising analogue and digital components and a suitable number of ports for wireline or wireless communication.

The processing circuitry 1010 controls the general operation of the control unit 1100, e.g., by sending data and control signals to the interface 1030 and the storage medium 1020, by receiving data and reports from the interface 1030, and by retrieving data and instructions from the storage medium 1020. Other components, as well as the related functionality, of the control node are omitted in order not to obscure the concepts presented herein.

Figure 11:
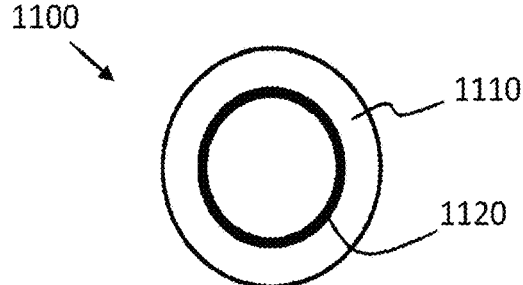
FIG. 11 shows an example computer program product.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A electronic control unit for controlling a heavy-duty vehicle, the electronic control unit being configured to receive ambient environment data from one or more environment sensors on the heavy-duty vehicle, and configured to predict an impact of the ambient environment on the motion of the heavy-duty vehicle, wherein the electronic control unit is configured to coordinate control of one or more motion support devices, MSDs, on the heavy-duty vehicle to compensate for the predicted impact of the ambient environment on the motion of the heavy-duty vehicle, where the electronic control unit is configured to predict one or more wheel tracks of the heavy-duty vehicle, and wherein the ambient environment data comprises a road surface condition along the one or more predicted wheel tracks of the heavy-duty vehicle, wherein the predicted impact of the ambient environment on the motion of the heavy-duty vehicle comprises a predicted change in rolling resistance for one or more wheels on the heavy-duty vehicle.

2. The electronic control unit according to claim 1, wherein the ambient environment data comprises wind speed and or wind direction data, wherein the predicted impact of the ambient environment on the motion of the heavy-duty vehicle comprises a predicted change in wind force on the heavy-duty vehicle.

3. The electronic control unit according to claim 1, wherein the one or more environment sensors comprises a forward looking camera, lidar or radar sensor.

4. The electronic control unit according to claim 1, wherein the one or more environment sensors comprises one or more anemometers and/or one or more rain gauges.

5. The electronic control unit according to claim 1, wherein the predicted impact of the ambient environment on the motion of the heavy-duty vehicle is at least in part determined based on a model of a tire mounted onto a wheel on the heavy-duty vehicle.

6. The electronic control unit according to claim 1, arranged to control the one or more MSDs on the heavy-duty vehicle to generate a longitudinal and/or lateral wheel force to compensate for the predicted impact of the ambient environment on the motion of the heavy-duty vehicle.

7. The electronic control unit according to claim 6, arranged to account for lateral and/or longitudinal relaxation length of one or more tires of the heavy-duty vehicle, when controlling said one or more MSDs, by increasing tires slip ahead of the predicted impact.

8. The electronic control unit according to claim 1, arranged to control the one or more MSDs on the heavy-duty vehicle to generate a steering angle to compensate for the predicted impact of the ambient environment on the motion of the heavy-duty vehicle.

9. The electronic control unit according to claim 8, arranged to account for lateral relaxation length of a tire on the heavy-duty vehicle by generating a compensating steering angle ahead of the predicted impact.

10. The electronic control unit according to claim 6, arranged to account for one or more predetermined dynamic properties of an MSD by changing the set-point of said MSD ahead of the predicted impact.

11. The electronic control unit according to claim 1, arranged to receive weather data from a remote server.

12. The electronic control unit according to claim 1, arranged to classify a section of road surface ahead of the vehicle in dependence of road type, where each road type is associated with an expected rolling resistance.

13. The electronic control unit according to claim 1 wherein the ambient environment data comprises data from one or more smart tire sensors, wherein the electronic control unit is arranged to determine a road surface condition based on the data from the one or more smart tire sensors, and to use the data for controlling one or more MSDs arranged rearward from the wheel comprising the smart tire sensors.

14. The electronic control unit according to claim 1, arranged to classify a section of road surface ahead of the vehicle in dependence of data gather during a previous drive on the road section.

15. A vehicle comprising an electronic control unit according to claim 1.

16. A computer implemented method performed in an electronic control unit for controlling a heavy-duty vehicle, the method comprising:

predicting one or more wheel tracks of the heavy-duty vehicle, receiving ambient environment data from one or more environment sensors on the heavy-duty vehicle, wherein the ambient environment data comprises a road surface condition along the one or more predicted wheel tracks of the heavy-duty vehicle, predicting an impact of the ambient environment on the motion of the heavy-duty vehicle, where the predicted impact of the ambient environment on the motion of the heavy-duty vehicle comprises a predicted change in rolling resistance for one or more wheels on the heavy-duty vehicle, and coordinating control of one or more motion support devices, MSDs, on the heavy-duty vehicle to compensate for the predicted impact of the ambient environment on the motion of the heavy-duty vehicle.

17. A non-transitory computer readable medium storing program code for performing the steps of claim 16 when said program code is run on a computer or on an electronic control unit.

* * * * *